United States Patent [19]

Solie et al.

[11] 4,351,362

[45] Sep. 28, 1982

[54] ROTARY VALVE

[75] Inventors: James C. Solie; Samuel B. McClocklin, both of Owatonna, Minn.

[73] Assignee: Owatonna Tool Company, Owatonna, Minn.

[21] Appl. No.: 193,753

[22] Filed: Oct. 3, 1980

[51] Int. Cl.³ .................... F15B 13/044; F16K 31/02
[52] U.S. Cl. .................. 137/625.65; 137/625.21; 251/137; 251/138; 251/233
[58] Field of Search ............... 137/625.21, 625.65; 251/78, 137, 138, 233

[56] References Cited

U.S. PATENT DOCUMENTS

| | | | |
|---|---|---|---|
| Re. 15,965 | 12/1924 | Russell | 251/137 X |
| 2,404,349 | 7/1946 | Brant et al. | 137/139 |
| 2,619,121 | 11/1952 | Renick | 137/703 |
| 2,969,090 | 1/1961 | Norton | 137/625.65 |
| 2,972,467 | 2/1961 | Gilman | 251/138 |
| 2,989,082 | 6/1961 | Ray | 137/625.46 |
| 3,324,887 | 6/1967 | Mueller | 137/625.63 |
| 3,556,151 | 1/1971 | Masuda | 137/625.21 |
| 3,610,282 | 10/1971 | Woodling | 137/625.21 |
| 3,677,295 | 7/1972 | Schultz | 137/596.12 |
| 3,761,054 | 9/1973 | Abdo | 251/172 |
| 3,763,891 | 10/1973 | Stiltner | 137/625.18 |
| 3,892,259 | 7/1975 | McClocklin | 137/625.21 |
| 4,049,019 | 9/1977 | McClocklin | 137/625.21 |
| 4,095,616 | 6/1978 | Krieger | 137/596 |

FOREIGN PATENT DOCUMENTS

| | | |
|---|---|---|
| 2437754 | 2/1976 | Fed. Rep. of Germany ............ 137/625.21 |
| 837210 | 6/1960 | United Kingdom . |
| 983247 | 2/1965 | United Kingdom . |
| 1100942 | 1/1968 | United Kingdom . |

*Primary Examiner*—Gerald A. Michalsky
*Attorney, Agent, or Firm*—Wegner, McCord, Wood & Dalton

[57] ABSTRACT

A rotary valve, and more particularly a rotary directional control valve having a rotatable valve member operable by a two-stage operating lever providing a relatively long lever arm and an intermediate shorter lever arm. Solenoid-actuated actuator members are movable along a line for engagement with the shorter lever arm when the operating lever is in a neutral position extending in a direction generally normal to said line and for engagement with the relatively long lever arm when the operating lever is at a substantial angle to said line whereby a solenoid of medium force and moderate length stroke can be utilized in returning the operating lever to the neutral position.

4 Claims, 10 Drawing Figures

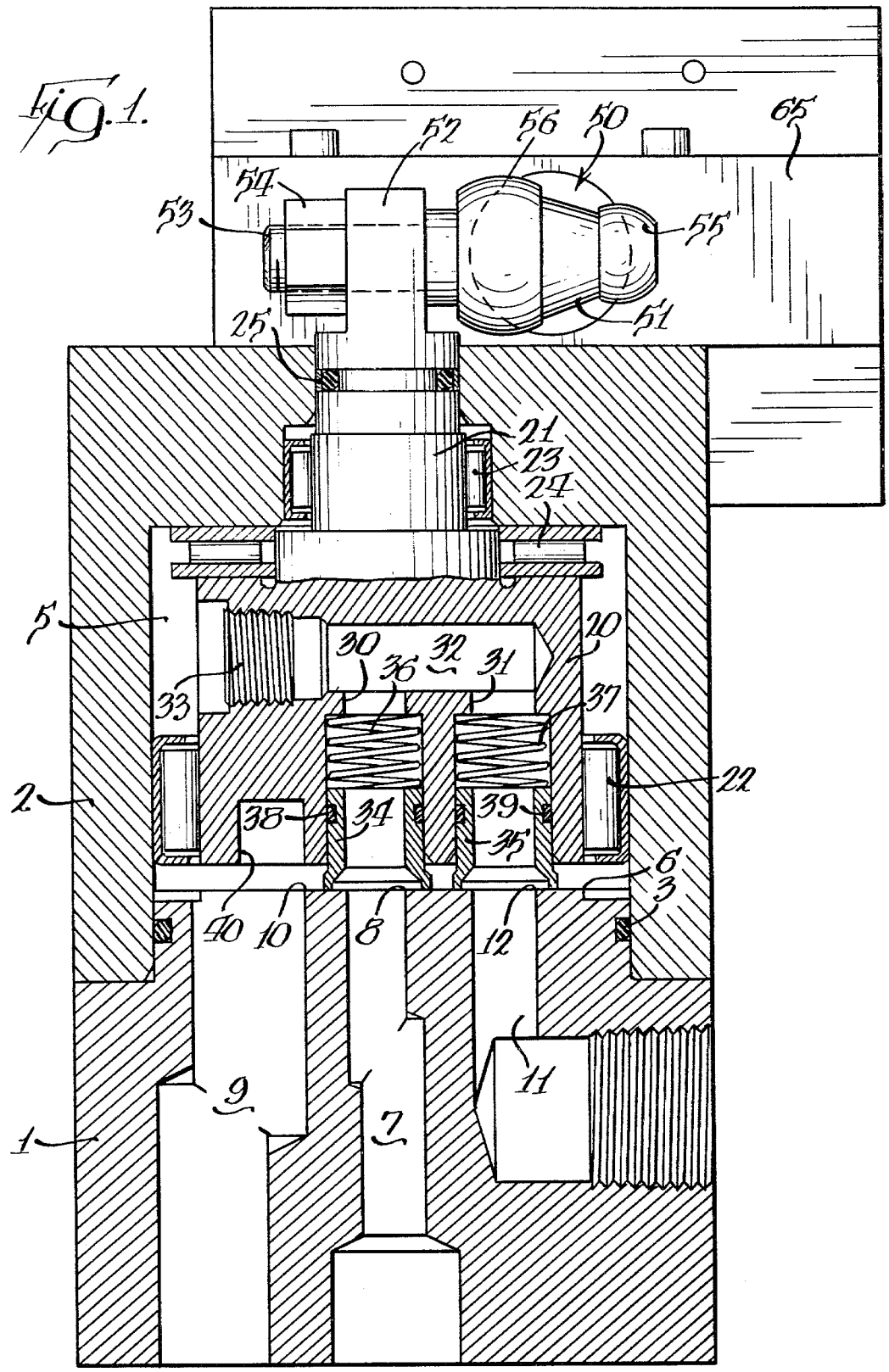

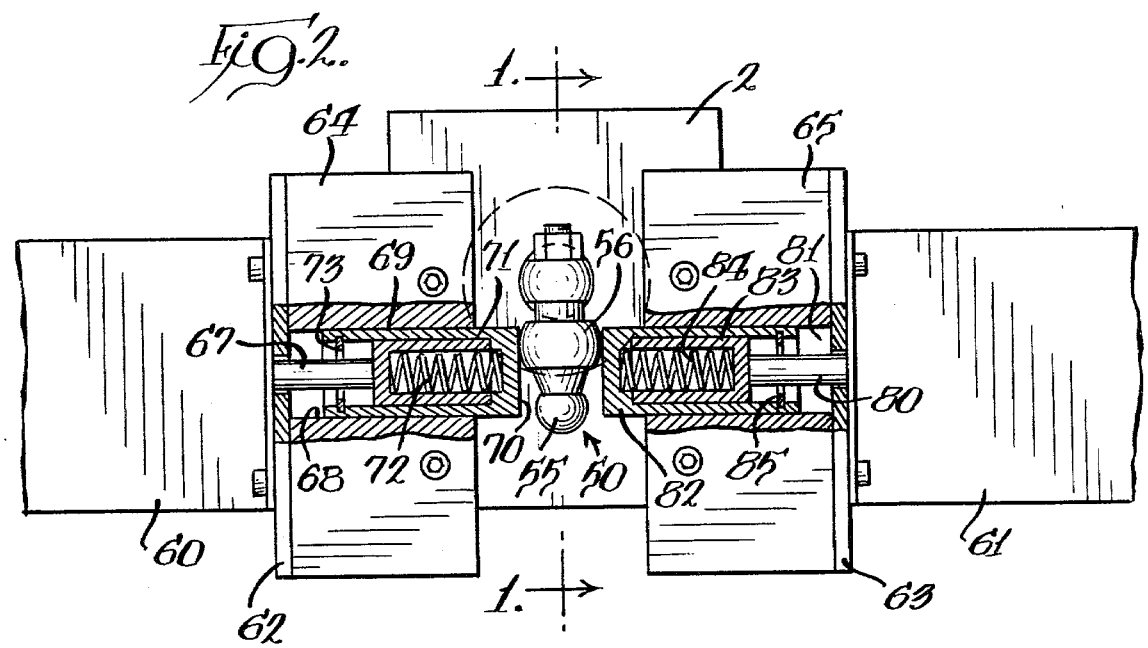
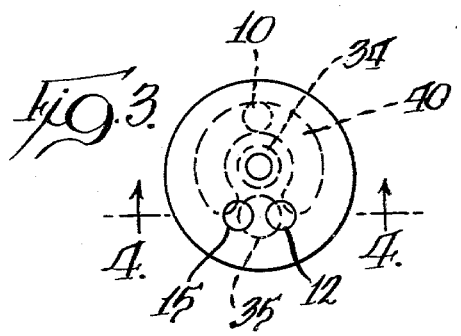
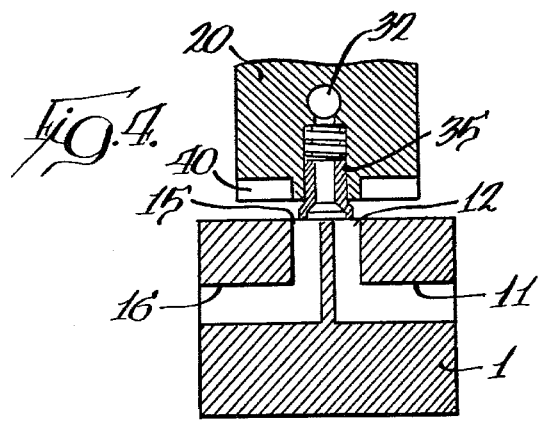

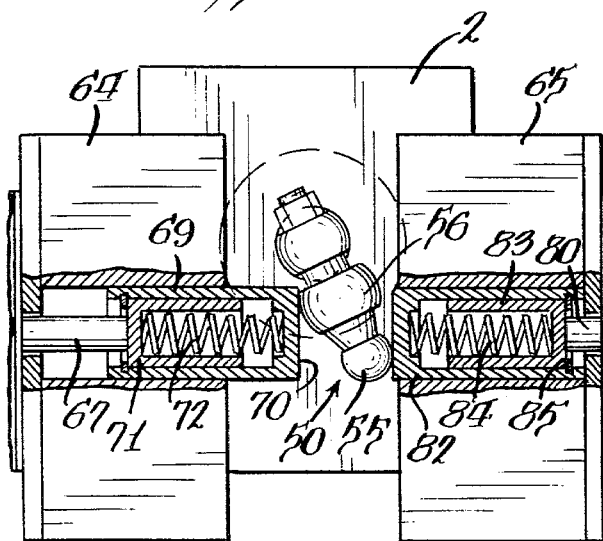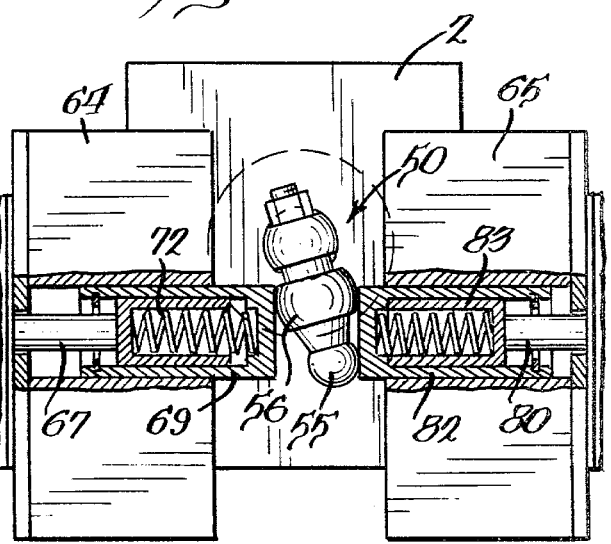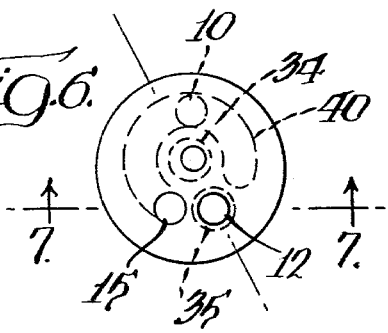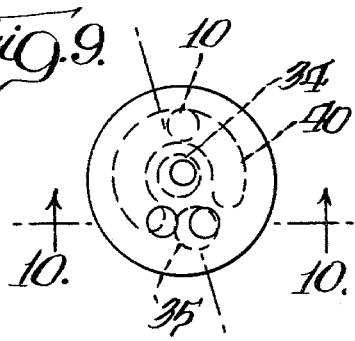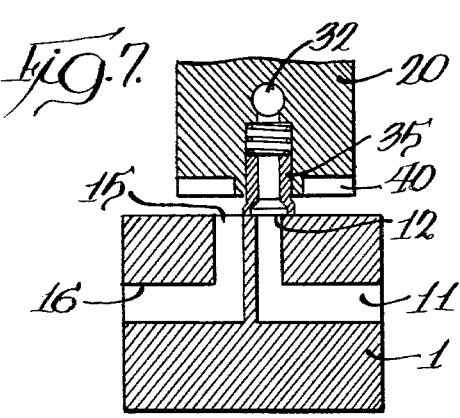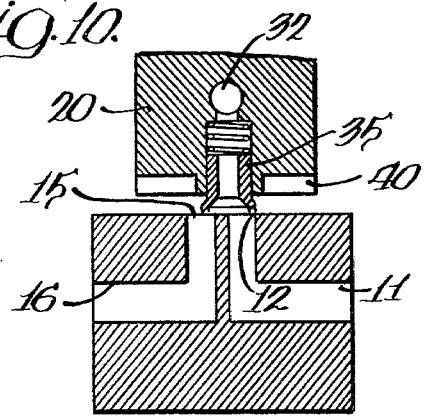

ROTARY VALVE

BACKGROUND OF THE INVENTION

This invention permits to a valve having a valve member positioned by structure including a two-stage operating lever which is positionable by a solenoid of medium force and moderate length stroke. The solenoid acts on a longer lever arm of the operating lever when maximum torque is required for movement of the valve member and, thereafter, when lesser torque is required, the solenoid acts on a shorter arm of the operating lever to cause increased movement of the valve member relative to the stroke of the solenoid.

Rotary control valves for directional control are known in the art, including the valves shown in McClocklin U.S. Pat. Nos. 3,892,259 and 4,049,019, owned by the assignee of this application. The prior patents show such valves which are manually operable and, thus, the force required for rotating the valve member of the rotary valve to and from desired positions is manually applied. For remote control of valves, it is known to use hydraulic motors or solenoids. In replacing the manual operator of the prior rotary valves, a designer of such remote control would select either hydraulic motors or solenoids capable of generating sufficient torque for moving the valve member and also having sufficient stroke for moving the valve operator through the desired distance to cause resulting rotation of the valve member. These requirements lead to increased cost and size of components.

SUMMARY OF THE INVENTION

A primary feature of the invention disclosed herein is to provide a valve having a valve operator rotatable about an axis and which has a two-stage operating lever associated therewith whereby the actuating mechanism, such as a pair of solenoids, may act at different times upon different parts of the operating lever to reduce the strength and stroke requirements of the solenoids whereby the operation can be achieved by use of solenoids of medium force and moderate length stroke.

In carrying out the foregoing, it is known that the greatest force required to rotate the valve member occurs in shifting the valve member from one directional control position wherein parts of the valve are subject to maximum pressure. At a lower pressure, the valve member can be shifted with relatively little force. In order to utilize a solenoid actuator to the greatest advantage, a two-stage operating lever is associated with the valve member to provide a relatively long lever arm for actuation by structure associated with the solenoid for initial rotation of the valve member from an operative position to release pressure and, thereafter, the solenoid-operated structure acts on a shorter lever arm requiring less force for movement of the valve member but providing greater total movement of the valve member in response to the stroke of the solenoid.

An object of the invention is to provide a rotary directional control valve operable by a solenoid of medium force and moderate length stroke comprising, a valve body, a valve member rotatably mounted in said valve body, a two-stage operating lever operatively connected to said valve member providing a relatively long lever arm and an intermediate shorter lever arm, and a solenoid-actuated actuator member movable along a line for engagement with the shorter lever arm when said operating lever is in a position normal to said line or at a small angle to either side of said position and for engagement with the relatively long lever arm when the operating lever is at a greater angle at either side of said position.

Another object of the invention is to provide a valve having a valve operator rotatable about an axis and means for positioning said valve operator comprising, an elongate operating lever connected to said valve operator and extending at an angle to said axis and having first and second engageable areas at different distances from said axis, an actuator mechanism for said valve operator including a pair of movable members positioned at opposite sides of said operating lever for acting in opposition to each other along a line tangent to an arc having said axis as its center, and said members having a surface of a length normal to said line to engage either of said engageable areas depending upon the rotative position of the valve operator.

Still another object of the invention is to provide a valve having a valve operator rotatable about an axis and means for positioning said valve operator comprising, an elongate operating lever connected to said valve operator and extending at an angle to said axis, and an actuator mechanism for moving said valve operator to and from either side of a neutral position comprising, a pair of solenoids each with a plunger positioned at opposite sides of said operating lever, a pair of actuator members associated one with each solenoid and engageable with opposite sides of said operating lever, and a pair of springs and spring guides interposed one between each actuator and associated solenoid plunger whereby energization of both solenoids compresses both springs to maintain the operating lever in said neutral position, deenergization of a solenoid permits the compressed spring associated with the other solenoid to advance the associated actuator member and move the operating member away from the neutral position, and subsequent reenergization of the deenergized solenoid causes engagement of a spring guide with the associated actuator member to return the operating lever to said neutral position and compress the spring associated with the other solenoid.

BRIEF DESCRIPTION OF THE DRAWINGS

FIG. 1 is a vertical central section of the rotary valve, taken generally along the line 1—1 in FIG. 2, andon an enlarged scale;

FIG. 2 is a plan view of the rotary valve in neutral position, with parts broken away;

FIG. 3 is a diagrammatic view showing the relation between the ports when the rotary valve is in neutral position;

FIG. 4 is a vertical section of certain rotary valve components positioned as shown in the diagrammatic view of FIG. 3 and generally along the line 4—4 in FIG. 3;

FIG. 5 is a view, similar to FIG. 2, with parts broken away and showing the rotary valve positioned in one of its operative positions;

FIG. 6 is a diagrammatic view showing the porting with the rotary valve positioned as shown in FIG. 5;

FIG. 7 is a view taken generally along the line 7—7 in FIG. 6;

FIG. 8 is a view similar to FIG. 2 showing the rotary valve positioned intermediate a neutral position and an operative position;

FIG. 9 is a diagrammatic view, similar to FIG. 3, showing the relation of the porting in the position of the valve illustrated in FIG. 8; and FIG. 10 is a view similar to FIG. 4 and taken generally along the line 10—10 in FIG. 9.

DESCRIPTION OF THE PREFERRED EMBODIMENT

The rotary valve has a body formed by a base 1 which interfits with a cap 2. The base and cap are sealed together by an O-ring 3 and define a chamber 5 within the valve body.

The base 1 has several passages leading to a face 6 thereof which is hardened and ground for coaction with structure to be described. The passages include a pressure passage 7 leading to a port 8 at the face 6, a return passage 9 extending from a return port 10 at the face 6, and a pair of control passages, one of which is shown at 11, and which has a control port 12 at the face 6. The control port 12 is shown in FIG. 3 along with a second control port 15 which has a passage 16. The passages 11 and 16 extend from the control ports 12 and 15 and open to the exterior of the valve body for connection to lines extending to an operating device, such as opposite ends of a hydraulic cylinder.

A valve member 20 is rotatably mounted within the chamber 5 for rotation about an axis defined by the rotative axis of a shaft 21 extending upwardly from the valve member and rotatably mounted within an opening at the upper end of the body cap 2. The valve member and shaft are mounted for rotation by needle bearings 22 and 23, respectively, for minimizing resistance to rotation thereof and with a thrust bearing 24 reacting to thrust exerted longitudinally of the valve member and shaft. An O-ring 25 is in sealing relation with the shaft and the cap opening.

The valve member 20 has a pair of vertically-extending passages 30 and 31 which are interconnected by a transverse passage 32 which is plugged at an end thereof by a plug 33. Each of the passages 30 and 31 has a seat seal 34 and 35, respectively, positioned therein. The seat seals have their lower ends lapped to a flat surface to bear against the face 6 of the valve body base 1. Each of the seat seals is urged toward the face 6 by the respective springs 36 and 37 and the exterior of the seat seals is sealed to the passage walls in which they are received by respective O-rings 38 and 39 positioned within peripheral grooves in the seat seals. The area of the seat seals 34 and 35 facing the interconnecting passage 32 is slightly larger than the area that bears against the face 6 of the body base 1, with only sufficient differential force to maintain leakproof contact against the face 6 when there is high pressure in the interconnecting passage 32.

The return passage 9 communicates with the space between the face 6 of the body base 1 and the lower face of the valve member 20 whereby fluid within said space can flow to the return passage and, in certain conditions, this flow path is increased by an arcuate groove 40 formed in the lower face of the valve member.

Referring to FIGS. 3, 6 and 9, certain positions of the rotary valve are shown in these diagrammatic views. In FIG. 3, the rotary valve is shown in a neutral position. In this position and all other positions, the seat seal 34 communicates with the pressure passage 7 and pressure port 8. The pressure port 8 and the seat seal 34 are located slightly off-center relative to the axis of rotation of the valve member to provide a wiping action between the seat seal and the face 6 of the body base during rotation of the valve member.

In the neutral position, both of the control ports 12 and 15 communicate with the space between the valve member 20 and the face 6 and also groove 40 on the underface of the valve member 20 whereby both cylinder ports communicate with the return passage 9. Pressure fluid from the pressure passage 7 flowing through the valve member passages 30, 31 and 32 is also free to flow to the return port by flowing through the seat seal 35 and to the groove 40.

In FIG. 6, the valve member 20 has been rotated to a position where the seat seal 35 surrounds the control port 12 whereby pressure fluid flowing through the valve member is directed to control port 12 and through passage 11 to one end of the device to be operated. The other control port 15 is connected to return through the groove 40. An intermediate position of the valve member 20 is shown in FIG. 9 wherein the valve member has partially returned to the neutral position of FIG. 3 and to the extent that the seat seal 35, while still communicating with the control port 12, has entered into communication with the control port 15, so that both control ports are connected to the return passage through the groove 40.

The valve member 20 can be rotated to a position beyond neutral, opposite to that shown in FIG. 9, wherein pressure fluid is directed to the control port 15 and control port 12 is connected to return.

The valve member position is controlled by actuator mechanism including a two-stage operating lever connected to a valve operator. The two-stage operating lever is identified generally at 50 and is in the form of an elongated arm 51 extending at an angle to the axis of rotation of rotatable shaft 21 and having a part thereof fitted into an opening 52 at the upper end of the rotatable shaft 21, which defines a valve operator, and having a threaded end 53 carrying a nut 54 for holding the arm fixed to the rotatable shaft 21. The arm 51 has first and second engageable areas 55 and 56 which are located at different distances from the rotation axis of the rotatable shaft 21.

The length of arm 51 to the engageable area 55 provides a relatively long lever arm, while the arm length to the engageable area 56 provides a shorter lever arm.

The actuator mechanism includes a pair of solenoids 60 and 61 mounted to the upper end of the valve body cap 2 by a pair of solenoid-mounting brackets 62 and 63, respectively. The inner faces of the solenoid mounting brackets 62 and 63 mount a pair of plunger guides 64 and 65, respectively. The mounting bracket 62 has an opening through which a solenoid plunger 67 can pass and extend into a bore 68 of the plunger guide 64. A hollow plunger 69 is movable within the bore 68 of the plunger guide and defines an actuator member having a face 70 of a length to engage with the engageable areas of the two-stage operating lever 50. A spring guide 71 is movably mounted within the plunger 69 and captures a spring 72 between an end of the plunger and an end of the spring guide. Movement of the spring guide outwardly of the plunger 69 is limited by a snap ring 73 fitted within an end of the plunger 69.

The solenoid-mounting bracket 63 has an opening through which a plunger 80 of the solenoid 61 extends into a bore 81 of the plunger guide 65. The plunger 80 is associated with an actuator member in the form of a hollow plunger 82. A spring guide 83 is mounted within the plunger and captures a spring 84 therebetween and with outward movement of the spring guide being limited by a snap ring 85.

The actuator members 69 and 82 are movable along a line which is tangent to an arc which has its center at the axis of rotation of the valve member. When the valve member 20 is in a neutral position, the operating lever 50 has a neutral position, shown in FIG. 2, and extends normal to said line.

In the neutral position of the valve, both of the solenoids 60 and 61 are energized to cause the solenoid plunger 67 and 80 to be extended to the position shown in FIG. 2. In this position, both of the springs 72 and 84 are compressed and the actuator members caused to engage against the engageable area 56 of the two-stage operating lever and which defines the relatively short lever arm. In this position as shown in FIGS. 3 and 4, the seat seal 35 communicates with both of the control ports 12 and 15 whereby pressurized fluid is not delivered to an actuating device with which the valve is associated. Assuming the control port 12 is to be connected to pressure fluid, the solenoid 61 is deenergized whereby the compressed spring 72 is effective to move the plunger 69 to the right, as viewed in FIG. 2, to the position shown in FIG. 5 and cause the operating lever 50 to move to the position shown in FIG. 5. This movement is not resisted by the actuator structure associated with thw solenoid 61 and, therefore, these parts move to the position shown in FIG. 5 wherein the spring 84 is free to expand and cause relative movement between the spring guide 83 and the plunger 82, with the outward movement of the spring guide being limited by the snap ring 85. In the operative position of FIG. 5, the seat seal 35 communicates with the control port 12, as shown particularly in FIG. 7, whereby pressure fluid can flow through the passage 11 to an end of an operated device, such as a hydraulic cylinder. During movement to the position of FIG. 5, there were no pressure connections whereby maximum force was not required for rotation of the valve member, so that the actuator member 69 can operate on the engageable area 56 of the operating lever providing the shorter lever arm to maximize rotation of the valve member relative to the stroke of the plunger.

When the valve member is to be returned to neutral position, the solenoid 61 is reenergized which returns the spring guide 83 into abutting relation with an internal shoulder of the plunger 82 and, thereafter, casues initial movement of the plunger and the operating lever back toward the position shown in FIG. 8. A higher force is required for this initial movement because of the pressure fluid connection to the control port 12 and, thus, the plunger 82 engages the engageable area 55 of the operating lever, as shown in FIG. 5. This provides a longer lever arm and, therefore, more force for rotating the operating lever away from the position of FIG. 5 and overcoming the force required to compress the spring 72 associated with the solenoid that has remained energized.

FIGS. 8 to 10 illustrate the position of the structure as soon as the pressure connection to the control port is discontinued. As shown in FIG. 10, the seat seal 35 has moved to a position wherein the control ports 12 and 15 are cross-connected whereby the control port 12 can now communicate with the return passage 9 to relieve pressure. At this time it will be noted as shown in FIG. 8, that the plunger 82 has come into contact with the engageable area 56 providing the shorter lever arm whereby the stroke of the solenoid plunger 80 results in a greater relative movement of the operating lever. When the solenoid plunger 80 is fully extended, the parts are back as positioned in FIG. 2 and with the operating lever maintained in a neutral position.

When it is desired to position the rotary valve for supplying pressure fluid to the control port 15, the solenoid 60 is deenergized whereby an action occurs, similar to that described in connection with deenergization of the solenoid 61, and, thereafter, upon reenergization of the solenoid 60, the parts are caused to return to the neutral position.

In one embodiment of the rotary valve, approximately 54° of rotation of the valve member is required to shift pressure communication from one control port to the other. This is a rotation of 27° from neutral position to connection to either of control ports 12 or 15. With the valve member positioned as shown in FIG. 7, there must be approximately 27° of rotation to move the valve member to the neutral position shown in FIG. 4 with approximately the initial 11 degrees of rotation being required to release the high pressure. It is the movement from the position shown in FIG. 5 to that shown in FIG. 8 wherein the action is on the engageable area 55, providing the longer lever arm, which produces the rotation needed to release pressure and, thereafter, a short lever arm for the remaining rotation of the valve member.

In carrying out the aforesaid action, only two seat seals are used, with the seat seal 35 covering one or the other of the control ports in the operative positions of the valve member and straddling both control ports in the center neutral position. This, together with location of the control ports close to the axis of rotation, minimizes the rotation required for moving the valve member between operative positions and thus limits the torque and stroke requirements for the solenoids.

A three-position valve has been shown using the solenoids 64 and 65 and with each solenoid having actuating structure associated therewith including a compressible spring. For two-position operation without the neutral position, the valve-actuating structure can be modified by replacing one of the plungers and associated structure, such as plunger 82, spring guide 83 and spring 84, by a solid plunger. In this construction, when one solenoid is energized, the other is deenergized to rotate the lever to one or the other of the control port positions.

We claim:

1. A valve having a valve operator rotatable about an axis and means for positioning said valve operator comprising, an elongate operating lever connected to said valve operator and extending at an angle to said axis, and an actuator mechanism for moving said valve operator to and from either side of a neutral position comprising, a pair of solenoids each with a plunger positioned at opposite sides of said operating lever, a pair of actuator members associated one with each solenoid and engageable with opposite sides of said operating lever, and a pair of springs and spring guides interposed one between each actuator and associated solenoid plunger whereby energization of both solenoids compresses both springs to maintain the operating lever in said neutral position and deenergization of a solenoid permits the compressed spring associated with the other solenoid to advance the associated actuator member and move the operating lever away from the neutral position, with reenergization of the deenergized solenoid causing engagement of a spring guide with the associated actuator member to return the operating lever to said neutral position and compress the spring associated with said other solenoid.

2. A valve as defined in claim 1 wherein said operating lever is engaged by the actuating members at one distance from said axis when the operating lever is in said neutral position, and the actuating member associated with the reenergized solenoid initially engages the operating lever at a greater distance from said axis.

3. A rotary directional control valve operable by a solenoid of medium force and moderate length stroke comprising, a valve body, a valve member rotatably mounted in said valve body, a two-stage operating lever operatively connected to said valve member providing a relatively long lever arm and an intermediate shorter lever arm, a pair of actuator members positioned at opposite sides of said operating lever and each movable along a line, spring means associated with said members establishing a neutral position of said members and operating lever wherein said operating lever extends normal to said line, said actuator members engaging with the shorter lever arm when said operating lever is extending normal to said line or at a small angle to either side of said last-mentioned position, and a pair of normally energized solenoids associated one with each member, deenergization of a solenoid permitting the associated member and operating lever to move by force exerted by the other member with the associated member in engagement with the relatively long lever arm.

4. A rotary valve having a body including a base and a cap defining a chamber, a valve member rotatably mounted in said chamber and having a face in opposed relation to a face of said base, passages in said base including a pressure passage and a return passage each having a port opening to the face of said base, said valve member having a pair of interconnected passages each with a port opening to said valve member face, two control passages in said base each with a port at the face of the base and positioned at opposite sides of the valve member port which communicates with the pressure passage, a seat seal with a central passage in each of said valve member ports for engagement with the face of the base, one of said seat seals being in constant communication with the pressure port of said base and the other seat seal being selectively positioned in communication with the control port in said base by rotation of the valve member about an axis, and means for rotating the valve member between a neutral position and a position in which said selective communication occurs comprising, a two-stage operating lever connected to said valve member and movable in an arc about said axis, a pair of actuator members positioned at opposite sides of the operating lever and movable along a line normal to said operating lever when the operating lever is in said neutral position and engageable with said operating lever at different distances from said axis in different rotative positions of said valve member, a pair of solenoids each having a plunger, a pair of springs and spring guides associated one with each of said actuator members and interposed between an actuator member and a solenoid plunger whereby energization of both solenoids compresses both springs to maintain the operating lever in said neutral position and deenergization of a solenoid permits the compressed spring associated with the other solenoid to advance the associated actuator member and move the operating lever away from the neutral position.

* * * * *